United States Patent

[11] 3,586,077

| [72] | Inventor | Mason E. Pease<br>Box 228, Pacific City, Oreg. 97135 |
|---|---|---|
| [21] | Appl. No. | 838,799 |
| [22] | Filed | July 3, 1969 |
| [45] | Patented | June 22, 1971 |

[54] CUTTING GUIDE MEANS FOR A PORTABLE POWERSAW
9 Claims, 10 Drawing Figs.

| [52] | U.S. Cl. | 143/6 G,<br>143/47 D |
|---|---|---|
| [51] | Int. Cl. | B27b 27/02 |
| [50] | Field of Search | 143/6–43,<br>6, 47, 47–6, 47–4; 269/81, 82, 98 |

[56] References Cited
UNITED STATES PATENTS

| 1,911,045 | 5/1933 | Tinnen | 143/6 |
|---|---|---|---|
| 2,677,399 | 5/1954 | Getsinger | 143/6 |

*Primary Examiner*—Donald R. Schran
*Attorney*—Kimmel, Crowell and Weaver

ABSTRACT: Cutting guide means for a portable powersaw wherein the guide means comprises an elongated platelike bar having a downwardly opening bottom longitudinal rectangular groove slidably receiving the heads of a pair of clamping bolts. Large-diameter nylon clamping nuts are threaded on the bolts and are engageable beneath opposite ends of the faceplate of a portable powersaw, the brackets having downwardly facing channels slidably engageable on the top rib for guiding the saw in a cutting path parallel to the bar. The bar may also include a protractor disposed at one end thereof, the protractor including a pivoted abutment arm movable to preselected angles. Clamp means is provided for locking the protractor arm in a preselected position on the protractor.

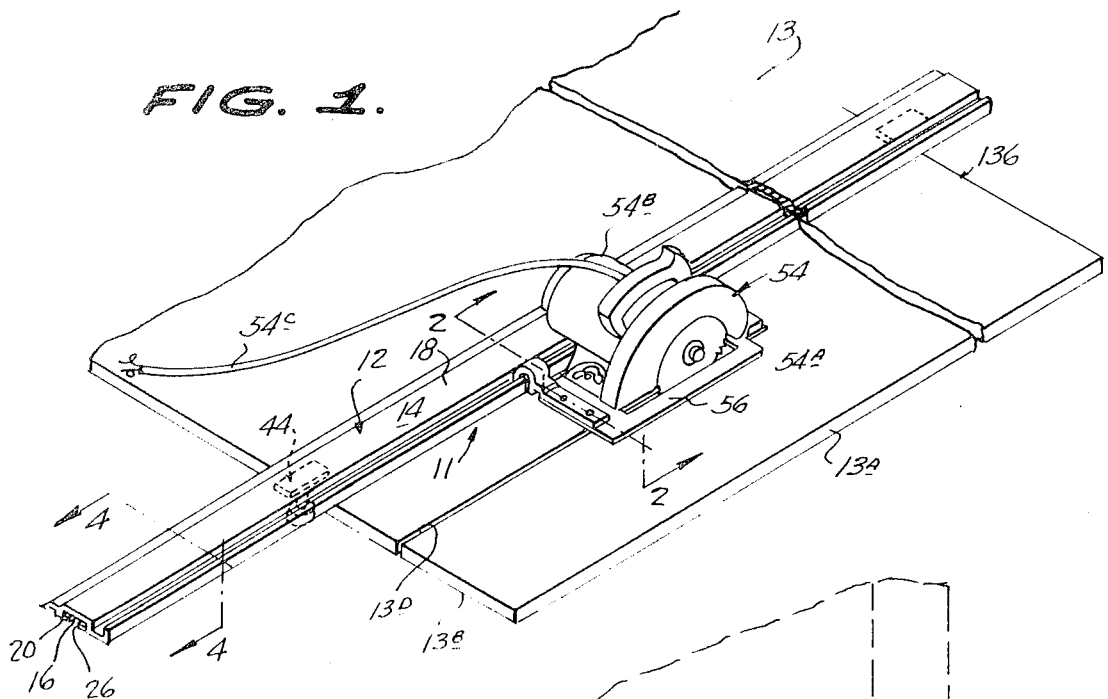
FIG. 1.
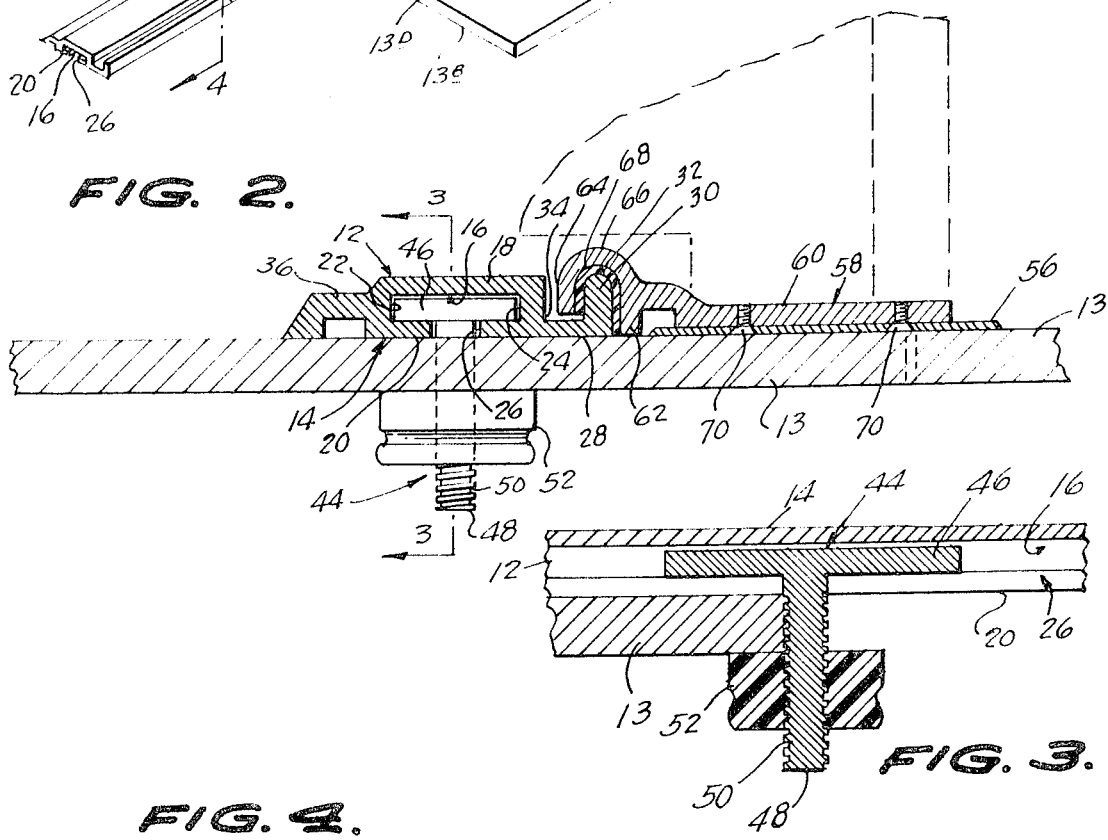
FIG. 2.
FIG. 3.
FIG. 4.
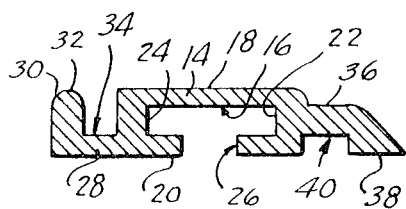
INVENTOR.
MASON E. PEASE,
BY Kimmel, Crowell & Weaver,
ATTORNEYS.

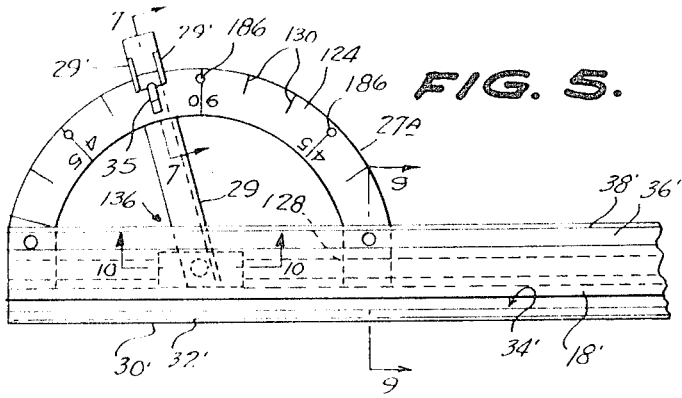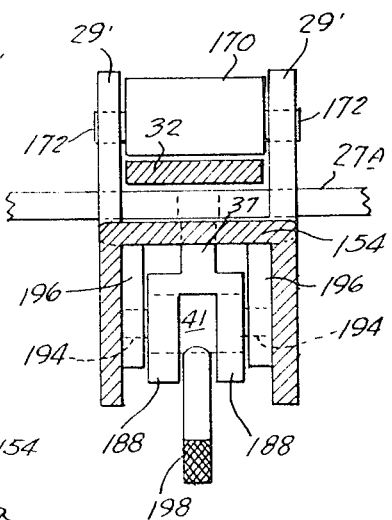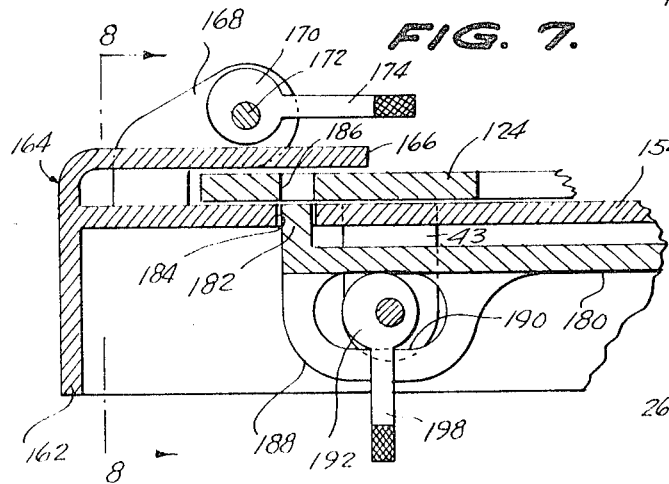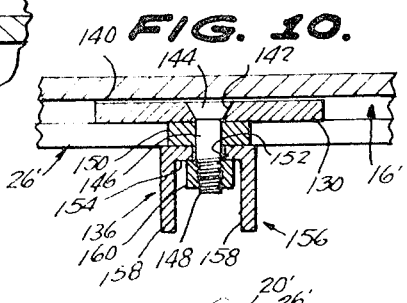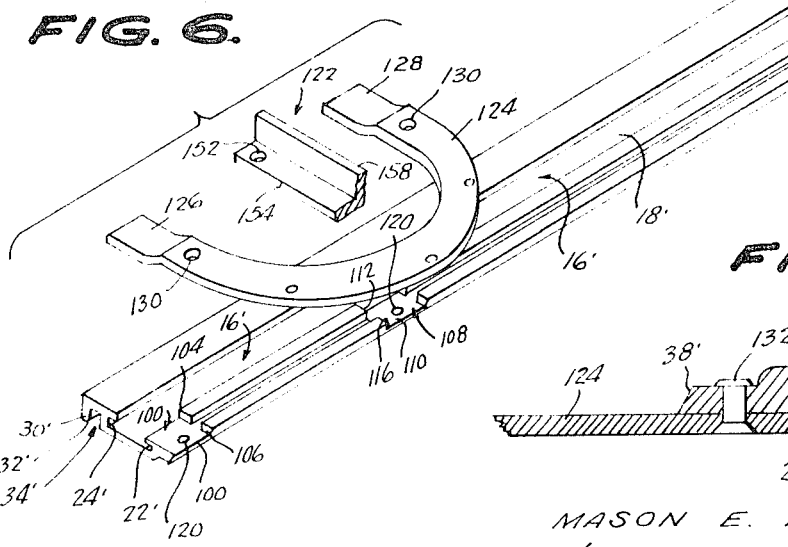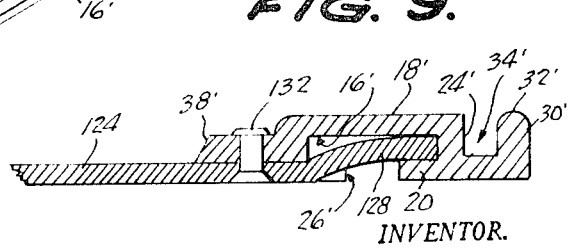
INVENTOR.
MASON E. PEASE,
BY Kimmel, Crowell & Weaver
ATTORNEYS.

CUTTING GUIDE MEANS FOR A PORTABLE POWERSAW

BACKGROUND OF THE INVENTION

1. Field of the Invention

This invention relates to the sawing of wood, compositions of wood and plastic materials, wherein the cutting element or member comprises a circular saw traveling a fixed guide superimposed on the material being worked.

2. Description of the Prior Art

Guide means for guiding a power driven hand operated saw having a circular blade is not, per se, new. However, the known prior art devices for guiding cutting saws are, for the most part, impractical and limited in application. For example, many of such prior art devices required the provision of a preformed frame to receive the material to be cut, and thereafter the saw fitted into a track, and when the saw was then actuated the same would make a perfect cut. Such saw guide means requires that the material first be fitted into the frame in exact contour therewith, and this, by its inherent construction, limited the use of the saw guide.

Again, it is known to fit the shoe of the saw with a rib to interfit within a groove formed on the guide track or bar. This results in limitations on the use of the handsaw since the fitting has to be removed before the saw can be employed for other normal usages. In an analogous manner, it is known in the art to detachably connect two or more lugs to the underside of the shoe of the saw, the lugs being adapted to track a groove formed in the guide. Here again, in order to utilize the hand saw after the same is disengaged from the guide track, the lugs must be removed. These devices are not only impractical, but the same give rise to time consuming efforts which add to the cost of a given operation.

SUMMARY

This invention relates to saw guides, and more particularly, to a saw cutting guide bar and assembly for a portable powersaw.

One of the primary objects of this invention is to provide a mechanic's kit which will include, for example, four cutting guide bars having lengths differing from one another; one having a length of 10 feet, the second a length of 6 feet, the third a length of 42 inches, and the fourth having a longitudinal length of 30 inches. The kit will contain protractors on the 30 and 42 inch lengths for the two smaller guide bars. The kit also preferably includes a bar set gauge and a book of instructions. With such a kit, the mechanic is prepared to cut, using the two larger bars, panels of wood, fiberglass, plastic and related materials, the 42-inch bar may be used in cabinet work, and the 30-inch bar for cutoff work. Such kits, it will become evident, could be made available for either right or left hand power driven saws. In connection with the first object of this invention as set forth supra, it is a further principal object of this invention to provide a novel and improved cutting guide bar for a portable powersaw, the guide bar being simple in construction, easy to attach to a workpiece, and being adjustable under some occasions to provide a desired angle of cut relative to one edge of the workpiece.

A further object of this invention is to provide an improved saw cutting guide bar which involves relatively inexpensive components, which is rugged and durable in construction and use, and which provides for an accurately linear cut on a workpiece.

Another object of this invention is to provide a saw cutting guide bar which may be releasably connected by conventional fasteners (a pair of small nails, for example) to a wall, storm sash or door, in order to cut on a straight line and to thereby facilitate installation and remodeling work.

A still further object of this invention is to provide an improved cutting guide bar or device for a portable powersaw which includes a protractor for adjusting the device to cut at a desired angle on a workpiece, the device being relatively compact in size, being light in weight, and being easy to manufacture.

A still further object of this invention is to provide an improved cutting guide bar for a portable power saw which may be employed to cut a wide range of sizes of material, and which can be effectively used even with pieces of material of relatively small size, the device being easy to assemble, having reliable means for securing it to a workpiece in an accurately preselected or predetermined angular position, and providing for a smooth and even cut.

Still another, and no less important, object of this invention is to provide on the saw means track or rail followers for releasable connection with the cutter guide bar which do not interfere with the normal use of the power saw in conventional operations following the disengagement of the powersaw from the guide bar.

Other and further objects and advantages of the instant invention will become more manifest from a consideration of the following specification when read in conjunction with the accompanying drawings.

BRIEF DESCRIPTION OF THE DRAWINGS

In the drawings:

FIG. 1 is a perspective view of an improved cutting guide bar constructed in accordance with the present invention, the guide bar being shown in its operative position on a workpiece with a powersaw engaged on the guide bar and making a cut through the workpiece;

FIG. 2 is an enlarged fragmentary detailed vertical transverse cross-sectional view, FIG. 2 being taken substantially on the vertical plane of line 2-2 of FIG. 1, looking in the direction of the arrows;

FIG. 3 is a fragmentary detail vertical transverse cross-sectional view, FIG. 3 being taken substantially on the vertical plane of line 3-3 of FIG. 2, looking in the direction of the arrows;

FIG. 4 is an enlarged transverse vertical detail cross-sectional view, FIG. 4 being taken substantially on the vertical plane of line 4-4 of FIG. 1, looking in the direction of the arrows;

FIG. 5 is a fragmentary enlarged top plan view of a second embodiment of this invention and showing a protractor mounted on one end of a smaller length of a saw guide member for use in cabinet and cutoff work;

FIG. 6 is an enlarged inverted and exploded perspective view of the saw guide bar and protractor assembly of FIG. 5;

FIG. 7 is an enlarged fragmentary detail transverse cross-sectional view, FIG. 7 being taken substantially on the vertical plane of line 7-7 of FIG. 5, looking in the direction of the arrows;

FIG. 8 is a fragmentary detail cross-sectional view, partly in elevation, FIG. 8 being taken substantially on the vertical plane of line 8-8 of FIG. 7, looking in the direction of the arrows;

FIG. 9 is an enlarged fragmentary detail transverse cross-sectional view, FIG. 9 being taken substantially on the vertical plane of line 9-9 of FIG. 5, looking in the direction of the arrows; and FIG. 10 is an enlarged fragmentary detail cross-sectional view, FIG. 10 being taken substantially on the vertical plane of line 10-10 of FIG. 5, looking in the direction of the arrows.

DESCRIPTION OF THE PREFERRED EMBODIMENTS

Referring now more specifically to the drawings, reference numeral 11 designates, in general, a cutting guide bar assembly for a powersaw constructed in accordance with the teachings of one embodiment of this invention. The assembly 11 comprises an elongated substantially rectangular platelike main bar 12 of sufficient length to permit the same to be engaged over a workpiece, for example to extend completely across a panel 13, to be cut, as is illustrated in FIG. 1 of the drawings.

The bar 12 includes an elongated substantially rectangular centrally located main body portion 14 which extends throughout its length. The main body portion 14 is formed with a longitudinally extending substantially rectangular channel 16 which opens at its ends in the planes of the remotely disposed ends of the main body portion 14. The channel 16 is defined by the opposed pair of spaced and substantially parallel top and bottom walls 18, 20, respectively, and the integrally connected laterally spaced and substantially parallel sidewalls 22, 24, respectively. The bottom wall 20 is formed with a longitudinally extending slot 26 which extends transversely therethrough and which is in open communication at its inner end with the channel 16. The slot 26, like the channel 16, opens at its opposed ends into the planes of the opposed ends in the main body portion 14.

As is seen in the several Figures of the drawings, the bottom wall 22 includes an extension or first flange 28 integrally formed therewith and which projects laterally from the main body portion 14 adjacent the sidewall 24. The flange 28 extends throughout the length of the bar 12 and at its outer longitudinally extending marginal edge, the flange 28 terminates in an upstanding longitudinally extending rail or track 30 having a rounded or arcuate upper end 32. The rail or track 30, the sidewall 24 and the flange 28 cooperate to define therebetween an upwardly opening elongated and substantially U-shaped groove 34. Preferably, the apex end of the rail or track 30 is disposed in the plane of the top wall 18.

At its other side, the bar 12 is provided with a second longitudinally extending flange 36 integrally connected with the sidewall 22 and projecting laterally therefrom intermediate the top and bottom walls 18, 20, respectively. The second flange 36 extends longitudinally throughout the length of the bar 12, and at its outer longitudinally extending marginal edge, the flange 36 terminates in a stabilizer foot portion 38. It should be here noted that the exposed lower sides (reference being made to FIG. 4) of the bottom wall 20, its associated flange 28 and the foot portion 38 are coplanar with respect to one another. To reduce weight and in the interest of economy of metal, the sidewall 22, the flange 36 and the foot portion 38 cooperate to define a second downwardly opening substantially U-shaped groove 40.

In the kit to which reference has been made supra, it is proposed to provide two of the bars described immediately above, each having the same cross-sectional configuration and differing from one another only in a matter of length. It has been found advantageous to provide one of such bars having a length of 10 feet, and a second one of such bars, the latter preferably having a length of 6 feet.

Means is provided for releasably securing the saw guide bar on a workpiece such as is indicated by reference numeral 13. Such means comprises a pair of T-shaped clamping bolts 44, each of which is provided with an elongated substantially rectangular crosshead 46 from the central portion of each of which downwardly depends a bolt shank 48 provided with a suitable ACME thread 50. As is seen in FIGS. 1 to 3, inclusive, each crosshead 46 is slidably received within the channel 16 with their respective shanks 48 projecting through the slot 26. Threadedly engaged on each of the shanks 48 is a large diameter nylon nut 52. With the bolts 44 located adjacent opposite edges of the workpiece 13 in the manner shown in FIG. 1, the nuts 52 are clampingly engaged with the bottom marginal surface of the workpiece 13 adjacent the edges thereof to clampingly secure the saw guide bar 12 in a selected saw-guiding position relative to the workpiece. It should be here noted that while the saw guide bar 12 is shown in FIG. 1 as extending substantially parallel to an end edge 13A of the workpiece 13, the nature and construction of the saw guide bar 12 and its connecting means is such that the saw guide bar 12 may be turned at any angle relative to the edge 13A. By the same token, the saw guide bar 12 may change its angularity relative to the end edges 13B and 13C, respectively, of the workpiece 13.

Reference numeral 54 (see FIG. 1) denotes a conventional portable powersaw provided with a bottom faceplate 56. Secured to the opposite transverse margins of the face plate 56 are, respectively, tracking shoes 58. Each tracking shoe 58 comprises a substantially solid elongated substantially rectangular main body portion 60 bifurcated at one of its ends to provide a pair of laterally spaced and substantially parallel arms 62, 64 which are integrally formed with and which depend from a downwardly opening arcuate bight portion 66. The inside surfaces of the arms 62, 64 and of the arcuate bight portion 66 are preferably provided with a nylon wear-resisting liner 68. The liner 68 is suitably shaped or formed to slidably receive the longitudinally extending rail or track 30 therein (see FIG. 2). Any suitable means such as the screws 70 may be employed to releasably connect the main body portion 60 on the faceplate 56.

In using the saw guide bar 12, the workpiece 13 is suitably supported as, for example, on a pair of sawhorses (not shown). The saw guide bar 12 is then laid across the upper side of the workpiece 13, as shown in FIG. 1, and is positioned in accordance with the desired angle of cut. The clamping bolts 44 are then moved inwardly into engagement with the opposite end edges of the workpiece 13, and the large nylon nuts 52 are then manually tightened so as to clampingly engage the bottom end marginal surface portions of the workpiece 13 immediately adjacent the bolts 44. The powersaw 54 is then brought into juxtaposition with respect to the saw guide bar 12 in such a manner as to cause the bifurcated arms 62, 64, and their respective associated liner portions 68 to engage on opposite sides of the rail or track 30 with the bight portion 66 and its associated liner portion 68 engaging over the rounded or arcuate upper end 32 of the track or rail 30. In these positions, the arm 64 together with its associated liner portion 68 are engaged within the channel 34. The powersaw faceplate 56 is now rested on the upper surface of the workpiece 13, and the powersaw 56 is then energized. The powersaw is then moved longitudinally along the rail or track 30 and its circular sawblade will then make the cut 13D as the powersaw is moved.

It should be here noted that the saw guide bar 12 is relatively flat and of low height, so that it causes no interference with the motor 54B driving the sawblade 54A, the motor 54B being allowed to project over the saw guide bar 12. This allows the maximum cutting depth of the sawblade 54A to be utilized. The motor 54B, being of the electrical type, may be energized through the cable 54C which is adapted for connection to any conventional power outlet source (not shown).

FIGS. 5 to 10, inclusive, illustrate a second preferred embodiment of this invention. The saw guide means of FIGS. 5 to 9, inclusive, is substantially identical to the same means illustrated in FIGS. 1 to 4, inclusive, with but two exceptions. In the kit referred to supra, it is proposed to provide two saw guide members of the type illustrated in FIGS. 5 to 10, inclusive, one of which will have a longitudinal length of 42 inches, and the other of 30 inches. These shorter saw guide members serve to complement the kit in providing saw guide means which may be adapted for cabinet or cutoff work. The second departure from the first embodiment of this invention is the provision of protractor means at one end of the two shorter saw guide bars.

Since the saw bar guide of FIGS. 5 to 10, inclusive, finds many counterparts in the saw guide means or member of FIGS. 1 to 4, inclusive, the same reference numerals have been applied to identical components in the second embodiment but to which has been added a prime mark to provide a differentiation therebetween.

Referring now more specifically to FIGS. 5 to 10, inclusive, the saw guide bar is here designated by reference numeral 12'. With specific reference to FIG. 6 of the drawings, it is seen that the stabilizer foot portion 38' and the adjacent portion of the bottom wall 20' have been cut, milled or otherwise formed to provide a first substantially rectangular seat 100 at one end of the saw guide bar 12' and which is, in effect, a downwardly and outwardly opening substantially L-shaped groove defined by the planar side 102 comprising the leg portion of the groove and the edge portions 104, 106 at the adjacent inwardly spaced ends of the bottom wall 20' and the adjacent stabilizer foot portion 38'. Spaced inwardly from the first seat 100 but adjacent thereto is a second seat 108 which is also cut, milled or otherwise formed in the bottom wall 20' and the adjacent section of the stabilizer foot portion 38'. This second seat is again, downwardly opening and is substantially U-shaped comprising a bottom side 110 and the opposed pairs of confronting edges 112, 114 formed in the bottom wall 20' together with the opposed pairs of confronting edges 116, 118 formed in the stabilizer foot portion 38'. The first and second seats 100, 108 are each provided, respectively, with the transversely extending opening 120.

The protractor assembly is generally designated by reference numeral 122. The assembly 122 includes an arcuately shaped substantially flat arm 124 which extends through substantially an arc of 180° and terminates, at its respective ends in upwardly offset (see FIG. 9) tabs 126, 128. The upper side of the protractor arm (see FIG. 5) is formed with the usual protractor calibrations generally designated by reference numeral 130. The remotely disposed ends of the arm 124 are formed with one or more transversely extending openings 130, and these ends of the arms are adapted to be received within the first and second seats 100, 108, respectively, with the tabs 126, 128 extending transversely across the channel 16' to bear against the side wall 24' (see FIG. 9). The openings 120 associated with the seats 100, 108 and the openings 130 formed adjacent the ends of the protractor arm 124 are aligned with one another and receive therethrough any conventional securing device such as, for example, the rivets 132. In this above described assembly the underside of the arm 124 is substantially coplanar with the underside of the bottom wall 20.

Reference numeral 136 indicates, in general, the protractor bar assembly (see FIGS. 5 and 10) which comprises a substantially rectangular mounting plate 138 which is disposed within the channel 16' substantially centrally between the seats 100, 108. The mounting plate 138 may be secured to the top wall 18' by any conventional means such as, for example, an adhesive 140 which may comprise an epoxy glue or other suitable bonding materials. In FIG. 10, the thickness of the adhesive 140 has been exaggerated for the purpose of clarity of construction.

The mounting plate 138 is formed with a centrally located transversely extending opening 142 and receives a screw fastener 144 therethrough having a centrally located externally smooth shank 146 terminating in an externally threaded outer end 148. Mounted on the smooth shank portion 146 is a washer 150, and this portion of the shank also extends loosely through an opening 152 formed in the bight wall 154 of a channel shaped protractor abutment bar 156. The channel member or abutment bar 156 opens downwardly and includes a pair of oppositely disposed sidewalls 158. The abutment bar 156 is secured on the screw fitting 144 by means of the conventional nut 160 shown in FIG. 10, the latter being threadedly engaged with the threaded end 148 of the screw 144. The protractor assembly further comprises a transversely extending end wall 162 adjacent its free end, and as is seen in FIG. 7, the end wall 162 continues upwardly above the bight wall 154 into a substantially L-shaped extension 164 including an elongated leg portion 166. The leg portion 166 extends inwardly and overlies the arcuate arm 124 in vertically spaced relationship relative thereto. To serve a function to be described below, the channel shaped protractor abutment bar 156, its L-shaped extension 164 and including the leg portion 166 thereof are preferably formed of a flexible and resilient material.

The bight wall 154 is formed with a pair of upstanding laterally spaced and substantially parallel pivot lugs 168, 168 located adjacent the opposite sides thereof and disposed in confronting relationship. At 170 is designated a clamping roller eccentrically pivoted at 172, 172 (see FIGS. 7 and 8), and the roller 170 is provided with a radially extending operating handle 174. The leg portion 166 extends below the clamping roller 170 between the lugs 168, 168 in such a manner that the leg portion 166 is clampingly engageable with the protractor arcuate arm 124 upon rotation of the handle 174 in a counterclockwise direction, reference being made to FIG. 7 of the drawings. It will be noted in FIG. 7 that with the rotation of the handle 174 through an arc of slightly more than 180° in a counterclockwise direction, the eccentric roller 170 is rotated past a dead center position, thus providing a positive locking action.

An elongated flexible leaf arm 180 has one of its ends fixedly secured inside the channel shaped protractor abutment bar 156, and the other end thereof extends in the direction of the transverse wall 162 but is spaced inwardly therefrom. The aforementioned other end of the leaf arm 180 is free, and is provided with an upstanding pin element 182 which may be reciprocated through a suitable opening 184 formed in the bight wall 154 for selective reception in positioning apertures 186 provided in the arcuate protractor arm 124 at specific angular markings thereon, for example, at 45° intervals. The leaf arm 180 is formed with a pair of depending parallel lugs 188, 188 having aligned horizontal slots 190. A second clamping roller 192 extends transversely through the slots 190 and is eccentrically pivoted at 194, 194 in a pair of depending blocks 196, 196 secured to the inside surfaces of the sidewalls 158, 158, respectively, of the channel shaped protractor abutment bar 156. The roller 192 is provided with a radially extending operating handle 198.

With the handle 198 in its depending position shown in FIG. 7, the upper end of the pin 182 is disposed below the bottom plane of the arcuate protractor arm 124. When the handle 198 is rotated clockwise, reference being made to FIG. 7, the roller 192 forces the leaf arm 180 upwardly and elevates the pin element 182 so that it may be lockingly engaged in a selected one of the positioning apertures or openings 186. The handle 198 may be rotated sufficiently to cause the roller 192 to rotate past a dead center position, for example, by rotating the roller 192 through an arc of more than 90° and thereby obtain a locking action.

Thus, the locking handle 198 may be employed when it is desired to positively set the channel shaped protractor abutment bar 156 at any one of the specific angles on the protractor arcuate arm 124 whose marked position includes a positioning opening or aperture 186.

As has been mentioned above, the smaller lengths of the saw guide bar 12' are generally used in cabinet making or cutoff work. The use of such clamping bolts 44 in this type of work is optional.

It should here be noted that the common construction of the several bars permits the same to be produced inexpensively as, for example, by any old and well-known extrusion device and process.

Having described and illustrated two preferred embodiments of this invention, the same are defined in the following appended claims.

I claim:

1. Guide means for a portable powersaw comprising:
   an elongated substantially rectangular bar for positioning across a workpiece;
   said bar having an upstanding rail formed thereon and extending longitudinally thereof for engagement by said saw to guide said saw in a direction substantially parallel to said rail;
   said bar having a centrally located substantially rectangular longitudinally extending channel defined by opposed top and bottom walls, and an opposed pair of sidewalls, said bottom wall having a longitudinally extending slot formed therein throughout its length;
   fastening means on said bar engageable with opposed edge portions of said workpiece to releasably clamp said bar thereon;

said fastening means comprising T-shaped bolts having crossheads slidably received within said channel and threaded stems projecting laterally from each crosshead and extending through said slot for engagement against said opposed edge portions, respectively, of said workpiece; and a nut mounted on each of said stems for releasable engagement against the underside of said workpiece.

2. Guide means as defined in claim 1 wherein:

said bar includes a longitudinally extending main body portion including said channel, said slot, and said top, bottom and sidewalls defining the same;

said rail extending longitudinally of said main body portion in laterally spaced and in substantially parallel relationship relative to a side thereof and throughout its length; and stabilizing means projecting laterally from the other side of said main body portion and engageable with said workpiece.

3. Guide means as defined in claim 2 wherein:

said powersaw includes shoe means engageable over said rail for sliding movement longitudinally thereof.

4. Guide means as defined in claim 3 wherein:

said shoe means includes an elongated member fixedly mounted on said powersaw and having a bifurcated end comprising a pair of arms and an interconnecting bight;

said arms tracking said rail on opposite sides thereof upon movement of said powersaw longitudinally of said rail, and with one of said arms being slidably received within said groove and said bight slidably mounted over said rail.

5. Guide means as defined in claim 4 and:

liner means coextensive with each of said arms and said bight and being secured thereto for interposition between each shoe and adjacent portions of said rail.

6. Guide means as defined in claim 1 and:

protractor means fixedly secured to one end of said bar and projecting laterally from a side thereof.

7. Guide means as defined in claim 6 wherein:

said protractor means comprises a substantially semicircular flat arm having its ends fixedly secured on said bar;

an elongated protractor abutment arm having an end thereof pivotally connected on said bar and with an opposed end extending below and beyond said semicircular protractor arm; and means releasably connecting said protractor abutment bar on said protractor arm at preselected positions relative to one another.

8. Guide means as defined in claim 7 wherein:

said releasable locking means includes a leg element having an end fixedly connected on said protractor bar and an opposed end extending over said protractor arm in spaced relationship relative thereto; and means on said protractor bar operable to flex said leg member into engagement with said protractor arm to clampingly secure said protractor bar against movement relative to said protractor arm.

9. Guide means as defined in claim 8 wherein:

said protractor further includes:

forming said protractor arm with a plurality of transversely extending openings at preselected angular positions relative thereto; and pin means mounted on said protractor bar and operable to engage within a preselected one of said openings to hold said protractor arm and bar against relative movement between one another.